(12) United States Patent
Abrams et al.

(10) Patent No.: US 8,234,337 B2
(45) Date of Patent: *Jul. 31, 2012

(54) METHODS AND SYSTEMS FOR DETERMINING QUANTITATIVE BENEFITS OF TRAVEL AVOIDANCE THROUGH ONLINE WEB CONFERENCING AND TRACKING THEREOF

(75) Inventors: Ethan Terry Abrams, Phoenix, AZ (US); James M. Powers, Jr., Paradise Valley, AZ (US); Marie Prentice, Sierra Madre, CA (US)

(73) Assignee: Broadsoft Ilinc Communications, Inc., Gaithersburg, MD (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/317,410

(22) Filed: Dec. 23, 2008

(65) Prior Publication Data

US 2009/0210271 A1    Aug. 20, 2009

Related U.S. Application Data

(63) Continuation-in-part of application No. 11/818,198, filed on Jun. 13, 2007, now Pat. No. 7,590,690.

(51) Int. Cl.
*G06F 15/16* (2006.01)
*G06F 3/00* (2006.01)

(52) U.S. Cl. ............... 709/205; 709/204; 715/758

(58) Field of Classification Search .................. None
See application file for complete search history.

(56) References Cited

U.S. PATENT DOCUMENTS

| | | | |
|---|---|---|---|
| 7,100,204 B1 | 8/2006 | Myllymaki et al. | |
| 7,343,341 B2 | 3/2008 | Sandor et al. | |
| 7,590,690 B2 * | 9/2009 | Abrams et al. | 709/204 |
| 2003/0055665 A1 | 3/2003 | Fleming | |
| 2004/0049424 A1 * | 3/2004 | Murray et al. | 705/14 |
| 2004/0143467 A1 | 7/2004 | McAllister et al. | |
| 2007/0255457 A1 * | 11/2007 | Whitcomb et al. | 700/273 |
| 2008/0154671 A1 | 6/2008 | Delk | |
| 2010/0037151 A1 * | 2/2010 | Ackerman et al. | 715/753 |
| 2010/0085417 A1 * | 4/2010 | Satyanarayanan et al. | 348/14.08 |
| 2010/0280966 A1 | 11/2010 | Powers et al. | |

OTHER PUBLICATIONS

Notice of Allowance and Fee(s) Due for U.S. Appl. No. 11/818,198 (Jul. 31, 2009).
Non-Final Official Action for U.S. Appl. No. 12/785,124 (Jan. 27, 2012).
Irwin, "Gaining the Air Quality and Climate Benefit from Telework," pp. 1-27 (Jan. 2004).

* cited by examiner

*Primary Examiner* — Krista Zele
*Assistant Examiner* — Azizul Choudhury
(74) *Attorney, Agent, or Firm* — Jenkins, Wilson, Taylor & Hunt, P.A.

(57) ABSTRACT

Online web conferencing methods implemented in an information handling system are provided that determine and display various savings that result from The methods herein determine and display, among other variables, the total air emissions saved by being able to forego physical transportation of the users on account of being able to meet by an online web conference. Other types of savings that may be determined and displayed include cost savings, productivity savings, environmental savings, and any other type of saving or benefit that results from foregoing transportation of users to a hypothetical meeting location. Users may override default assumptions or estimates to more accurately model the estimated savings. Various transportation modalities may be included as desired. Reports may be generated that summarize the quantities determined by the models of the embodiments disclosed herein.

9 Claims, 16 Drawing Sheets

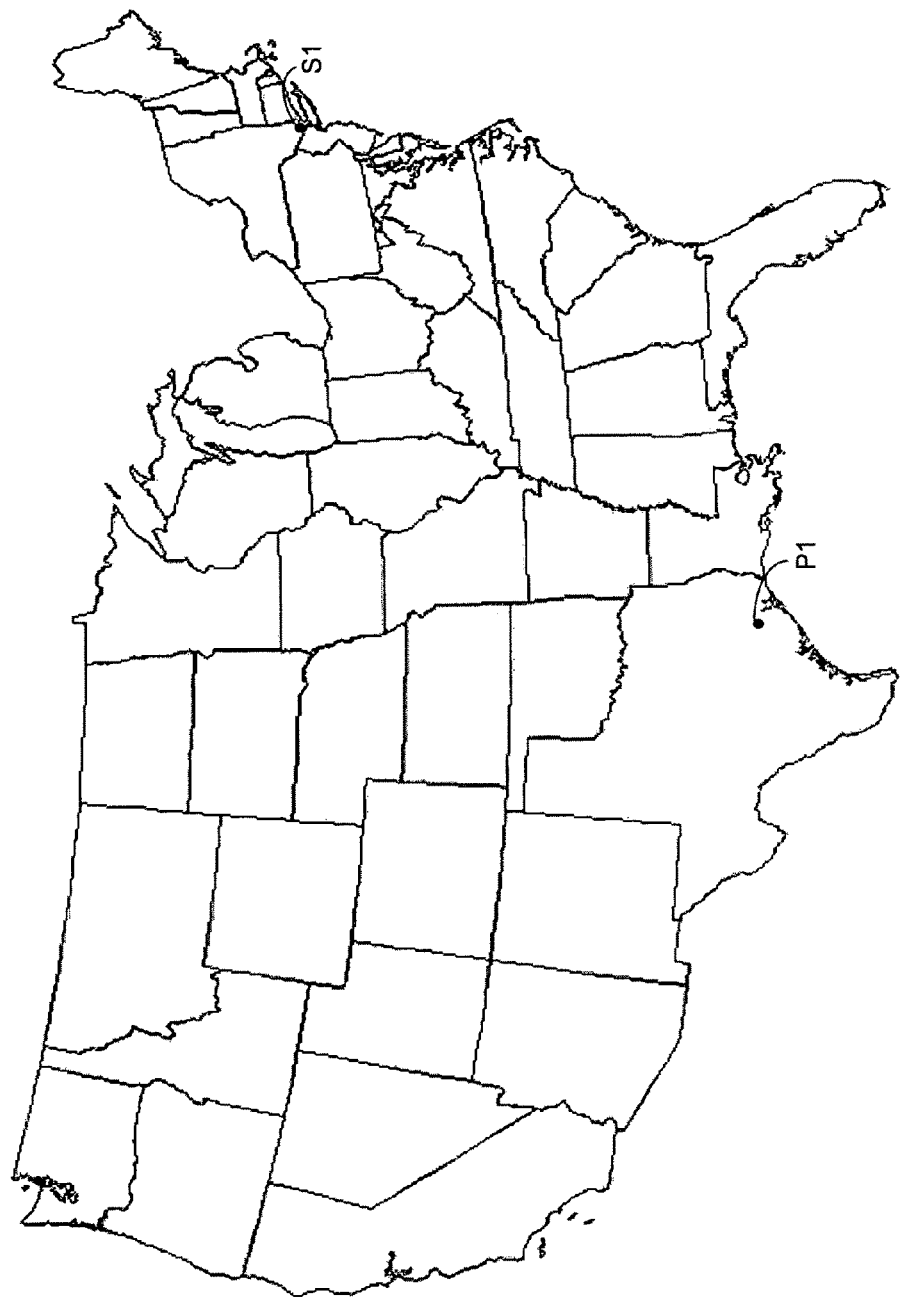

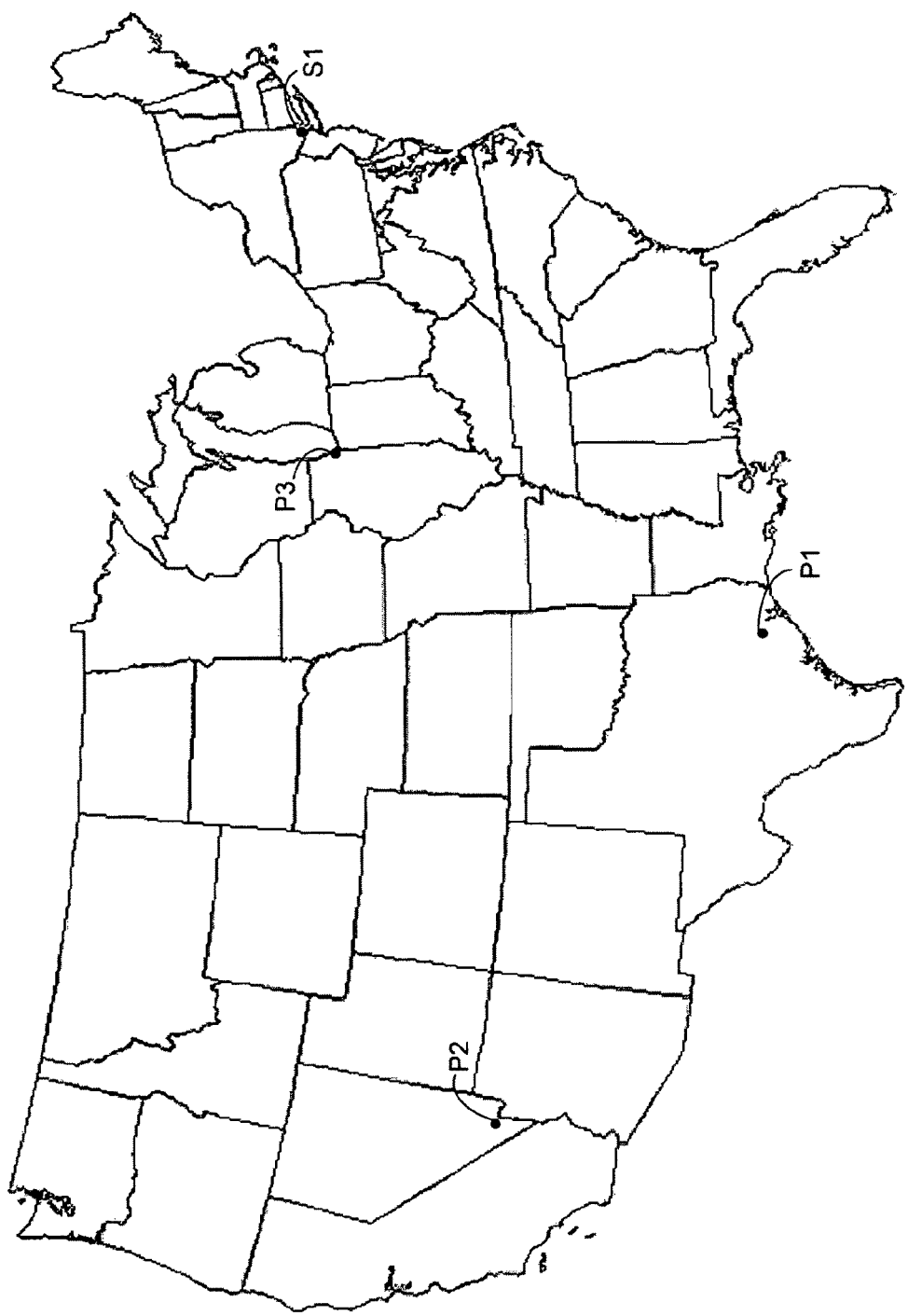

| | | | |
|---|---|---|---|
| 2 | ALBANY, NY | 3820 | 4332 ✈ |
| 5 | SAN JOSE, CA | 3100 | 1980 |
| 6 | HOUSTON, TX | 6048 | 2664 |
| 2 | PORTLAND, OR | 2022 | 890 |
| 1 | LONDON, ENGLAND | 5284 | 2097 |
| 1 | SEDONA, AZ | 121 | 189 🚗 |
| 1 | ATLANTA, GA | 1586 | 699 |
| 4 | DENVER, CO | 2360 | 1508 |
| 3 | ORLANDO, FL | 5541 | 2442 |

|◀| ▲ Page [1] of 26 △ ▷| Results 1-10 of 258 | Show [10] ▼ |

Don't see your location? Click here to update your location.

Green Meter

Site Display
- ☑ Emissions Savings
- ☑ Travel Savings
- ☑ Cost Savings - Unit: $ Display Savings in: ○ Metric Units ● Standard Units
Default Display: [ Emissions ▼ ]

Session Savings
Select the session types that can be included in savings calculations. To prevent individual session adjustment, lock the session type.

- ☑ MeetingLinc    ☐ Lock
- ☑ LearnLinc      ☐ Lock
- ☑ ConferenceLinc ☐ Lock
- ☑ SupportLinc    ☐ Lock

Cost Calculations
The following data will be used to calculate the cost savings associated with using iLinc.

Emissions Values
- Average Miles per Gallon: 20
- Distance when Air Travel is required: 200

Cost Values
- Travel Reimbursement per mi: $ 0.58
- Average Round Trip Airline Ticket Cost: $ 300.00
- Per Diem Rate: $
- Average Nightly Hotel Rate: $ Productivity Values
- Average MPH for Car: 45
- Average MPH for Air: 500
- Average Employee Hourly Rate: $ 20.00

Reset Cost Values

City: PHOENIX

OR

Zip Code:

☐ Thid is my permanent loc

Save  Cancel

To request Feedback, select Answer Set from Feedback menu

Chat

Public | Private

Type here to send a message  ⇧

METHODS AND SYSTEMS FOR DETERMINING QUANTITATIVE BENEFITS OF TRAVEL AVOIDANCE THROUGH ONLINE WEB CONFERENCING AND TRACKING THEREOF

CROSS-REFERENCE TO RELATED APPLICATION

This patent application is a continuation-in-part of U.S. patent application Ser. No. 11/818,198, filed Jun. 13, 2007 now U.S. Pat. No. 7,590,690, the entire specification of which is hereby incorporated by reference.

BACKGROUND

The present invention generally relates to systems and methods implemented in a computer system for determining quantitative benefits from foregoing physical transportation to a common meeting location through the use of online web conferencing. These quantitative benefits may be displayed to users, and customized reports may be generated that detail avoided costs, environmental impact, and/or productivity savings.

As concern for protection of the environment grows, the importance of companies showing responsible stewardship of the environment increases dramatically. Thus, methods which reduce and/or account for the reduction in air emissions and pollutants are desirable in that they allow companies to demonstrate their commitment to protecting the environment. Additionally, it is desirable to account for the environmental impact of various alternative actions to allow consumers to evaluate possible courses of action. As one example, consumers may be faced with a choice of traveling to a distant location for a training program, meeting, seminar, or class. By accounting for the environmental impact of alternatives such as using web conferencing instead of physical transportation, a consumer may be influenced to opt for web conferencing to aid in protecting the environment by foregoing physical transportation to a location. Additionally, by determining and accounting for the environmental impact of various courses of action, companies can demonstrate their positive impact on the environment by their selection and accounting of environmentally preferred choices.

Conventional online web conferencing methods, however, fail to quantify environmental benefits of using online web conferencing methods in lieu of physical meetings. Moreover, conventional online web conferencing methods fail to quantify other benefits and savings that result from foregoing physical transportation on account of online meetings. Accordingly, improved methods are needed that address one or more disadvantages of the prior art.

SUMMARY

The present invention generally relates to systems and methods implemented in a computer system for determining quantitative benefits from foregoing physical transportation to a common meeting location through the use of online web conferencing. These quantitative benefits may be displayed to users, and customized reports may be generated that detail avoided costs, environmental impact, and/or productivity savings.

One example of a method for online web conferencing implemented in an information handling system comprises: allowing a plurality of users to join an online meeting; allowing one of the users to override a default assumption or default estimate used to determine the one or more savings; determining one or more savings based in part on hypothetical travel distances of each user to a meeting location wherein the one or more savings is selected from the group consisting of: an air emission savings, a cost savings, and a productivity savings; and displaying the one or more savings to at least one of the users.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein:

FIG. 1A shows a map with example physical locations of a participant and a session leader.

FIG. 2A shows a map with example physical locations of a session leader and a plurality of participants.

FIG. 6 illustrates one example of a user-interface input dialog box allowing a user to override various default assumptions used in models of the present invention.

FIGS. 7A-7D illustrate one example of a user input dialog box allowing a user to override a default or estimated location by specifying a more accurate physical location.

Figure 1B:
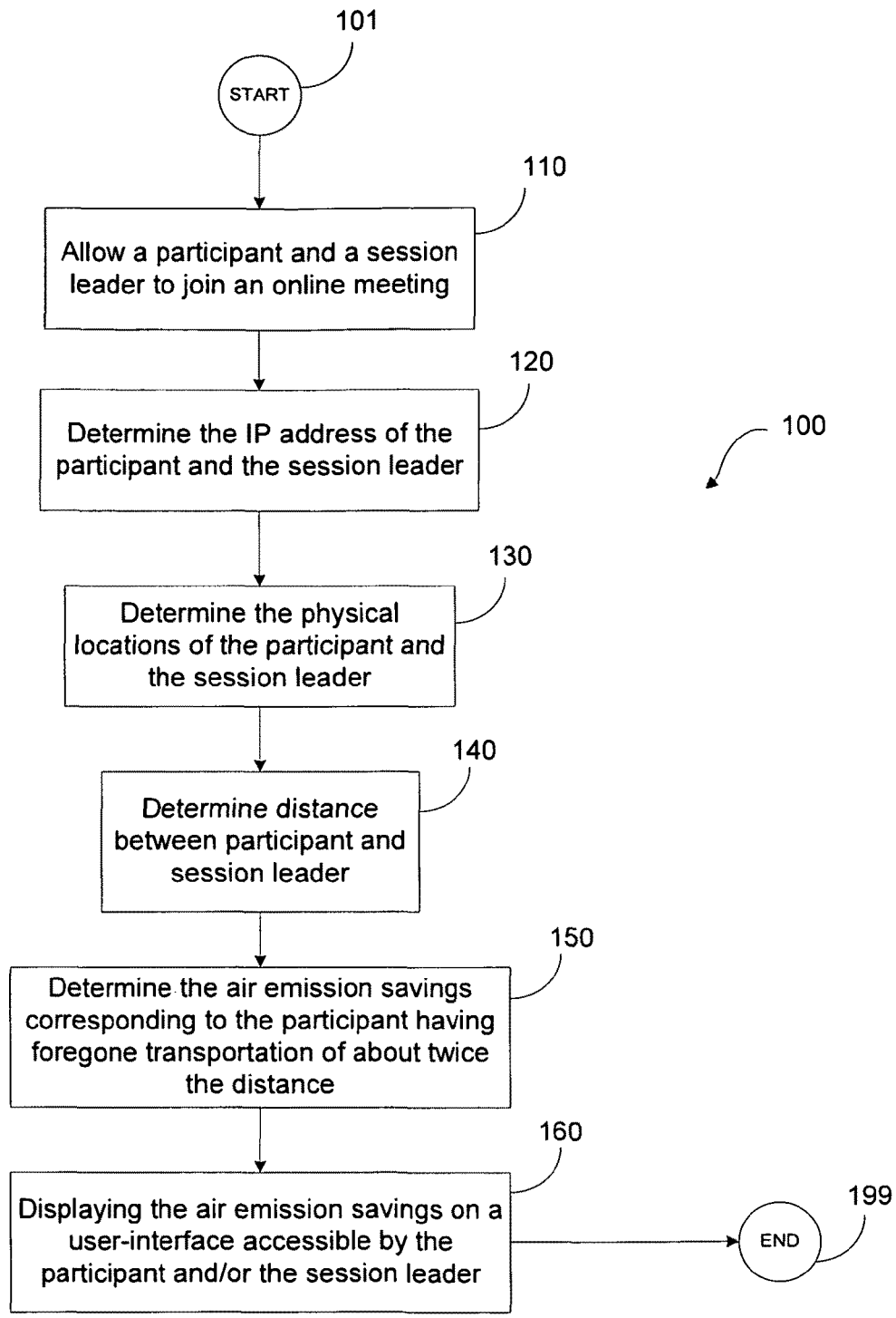
FIG. 1B illustrates an example of a method for determining an air emissions savings corresponding to using an online meeting to forego transportation of the participant.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION OF PREFERRED EMBODIMENTS

The present invention generally relates to systems and methods implemented in a computer system for determining quantitative benefits from foregoing physical transportation to a common meeting location through the use of online web conferencing. These quantitative benefits may be displayed to users, and customized reports may be generated that detail avoided costs, environmental impact, and/or productivity savings.

Various means as described below are employed to determine the benefits and savings that are realized from individuals foregoing physical transportation to a common meeting location, which are then displayed to one or more users. Examples of suitable quantitative savings include, but are not limited to, cost savings, productivity savings, environmental savings (e.g. air emission savings), or any combination thereof.

In this way, by using online meeting technology instead of conventional transportation to travel to a common physical meeting location, a number of quantitative benefits may be realized and tracked. Advantages of the methods of the present invention include, among others, the ability to quantify the savings that result from the use of online meeting technology and the ability to generate individualized and aggregated reports based on one or more online web conferences, seminars, and/or classes.

To facilitate a better understanding of the present invention, the following examples of certain embodiments are given. In no way should the following examples be read to limit, or define, the scope of the invention.

Although the embodiments depicted throughout FIGS. 1-3 are with reference to determining and displaying air emission savings, it is explicitly recognized that any quantitative benefit or savings that results from foregoing physical transportation to a common meeting location through the use of an online meeting may be determined and displayed as desired.

FIG. 1A shows a map with example physical locations of a participant and a session leader. In FIG. 1A, P1 refers to an example location of a hypothetical participant, in this case, Houston, Tex., and S1 refers to an example location of a hypothetical session leader, in this case, New York, N.Y.

FIG. 1B illustrates an example of a method for determining an air emissions savings corresponding to using an online meeting to forego transportation of the participant. Method 100 commences at step 101. In step 110, a participant and a session leader (or more generally, a user) join an online meeting. The term, "join," as used herein, refers to any action taken to subscribe or enlist a participant and/or a session leader to an online meeting and includes any action suitable to cause a participant and/or a session leader to become a member, become a member of, become a part of be, become joined or united or linked to an online meeting. The term, "online meeting," as used herein, includes any type of online teleconference, web conference, video conferencing, or any suitable online manner wherein individuals are permitted to share voice, graphic, and/or video communications through an automated networked computer system. In certain embodiments, a participant may join simply by indicating a desire to join an existing online meeting through a user interface by selecting an online meeting from a list of available online meetings In step 120, the IP address of the participant and the IP address session leader are determined. Any number of methods known in the art may be used to determine the IP address of the networked computer of the participant and the session leader. In certain embodiments, the web server provides each participant's IP Address as they join an online meeting or session based on the participant's end of the TCP socket making the join request. Other methods to determine the IP address of participants and session leaders that are known in the art may be employed in conjunction with the methods of the present invention.

In step 130, the physical locations of the participant and the session leader is determined or estimated by determining the physical locations corresponding to the IP address of the participant and the IP address of the session leader. Any number of methods may be used to determine the physical location corresponding to an IP address, including performing a WHOIS query and determining the registrant address corresponding to a user's IP address. Using the registrant address, a user's physical location may be determined using an address database or suitable mapping software. Any other suitable method known in the art may be used to determine the physical location corresponding to an IP address. FIG. 1B shows an example physical location of participant P1 (i.e. Houston) and session leader S1 (i.e. New York). The physical locations may be represented by longitude/latitude coordinates or any other type of coordinates for defining a location of participant P1 and session leader S1.

It is recognized that a user may be networked through a proxy connection or computer. In such an instance, instead of determining the IP address of the user, the IP address of the proxy connection will be instead determined. Thus, this method will end up estimating the user's physical location as the physical location of the proxy connection.

In step 140, the distance between participant P1 and session leader S1 is determined. The distance between these two points may be determined using standard trigonometric calculations. Alternatively, mapping software may be used to determine the distance between participant P1 and session leader S1. In the example depicted in FIG. 1B, a distance of 1,630 miles may be estimated as the driving distance between Houston and New York. Alternatively, a distance of 1,229 miles may be estimated as the flying distance between Houston and New York. In still other embodiments, a combination of ground transportation and air transportation may be assumed or selected. Any suitable method for determining the distance between two points may be used to determine the distance between participant P1 and session leader S1.

Based on the distance between participant P1 and session leader S1, an air emission savings is determined in step 150. The air emission savings corresponds to the quantity of air emission savings that result from foregoing transportation of the participant from the participant's physical location to the session leader's physical location. To determine the air emission savings, a mode of transportation may be assumed or selected. In certain embodiments, participant P1 is permitted to select the type of transportation that participant P1 would have used to travel to the session leader's physical location and back. In other embodiments, a mode of transportation is assumed. For example, for distances below a certain threshold (e.g. 200 miles), the method may assume that participant P1 would have driven using ground transportation to the destination and back if no online meeting opportunity were available. For distances above the threshold, the method may assume transportation by air travel by, for example, a commercial jet. Alternatively, any combination of transportation modes may be selected or assumed as desired to accomplish travel from participant P1's physical location to session leader S1's physical location and back.

Any suitable method may be used to estimate the air emission savings including assuming an average emissions rate that corresponds to a given mode of transportation. For example, an average emissions rate of 0.36 kg of $CO_2$ per mile (i.e. a $CO_2$ factor of 0.36) may be used to estimate the air emissions of a medium sized car. For an airplane mode of transportation, a $CO_2$ factor of 0.29 may be used for distances less 727 miles, a $CO_2$ factor of 0.20 may be used for distances between 727 miles and 2575 miles, and a $CO_2$ factor of 0.18 may be used to for distances greater than 2,575 miles. Any number of other suitable methods known in the art may be used to estimate $CO_2$ emissions or more generally, air emissions of a plurality of air pollutants, including, but not limited to $NO_x$ air emissions. Similarly, other $CO_2$ factors may be used for transportation by rail depending on the type of rail transport utilized.

Methods and factors suitable for determining air emissions, including $CO_2$ emissions may be found in the following references, all of which are hereby incorporated by reference: DEFRA, *Guidelines for Company Reporting on GHG Emissions*; U.S. Department of Energy, *Transportation Energy Data Book* (see e.g., Table 2.11 and A14-A16); Energy Information Administration, *Emissions of Greenhouse Gases in the United States* 2000 (see e.g., Appendix B, Table B1); and Energy Information Administration, Office of Integrated Analysis and Forecasting, U.S. Department of Energy, *Updated State-level Greenhouse Gas Emission Coefficients for Electricity Generation* 1998-2000 (April 2002).

In step 160, the air emissions savings is displayed on a user interface accessible by at least one participant and the session leader. Method 100 terminates at step 199.

FIG. 2A shows a map with example physical locations of a session leader and a plurality of participants. In this example, the physical location of participant P1 is shown as Houston, Tex., participant P2 is shown in Las Vegas, Nev., participant P3 is shown in Chicago, Ill., and session leader S1 is shown in New York, N.Y.

Figure 2B:
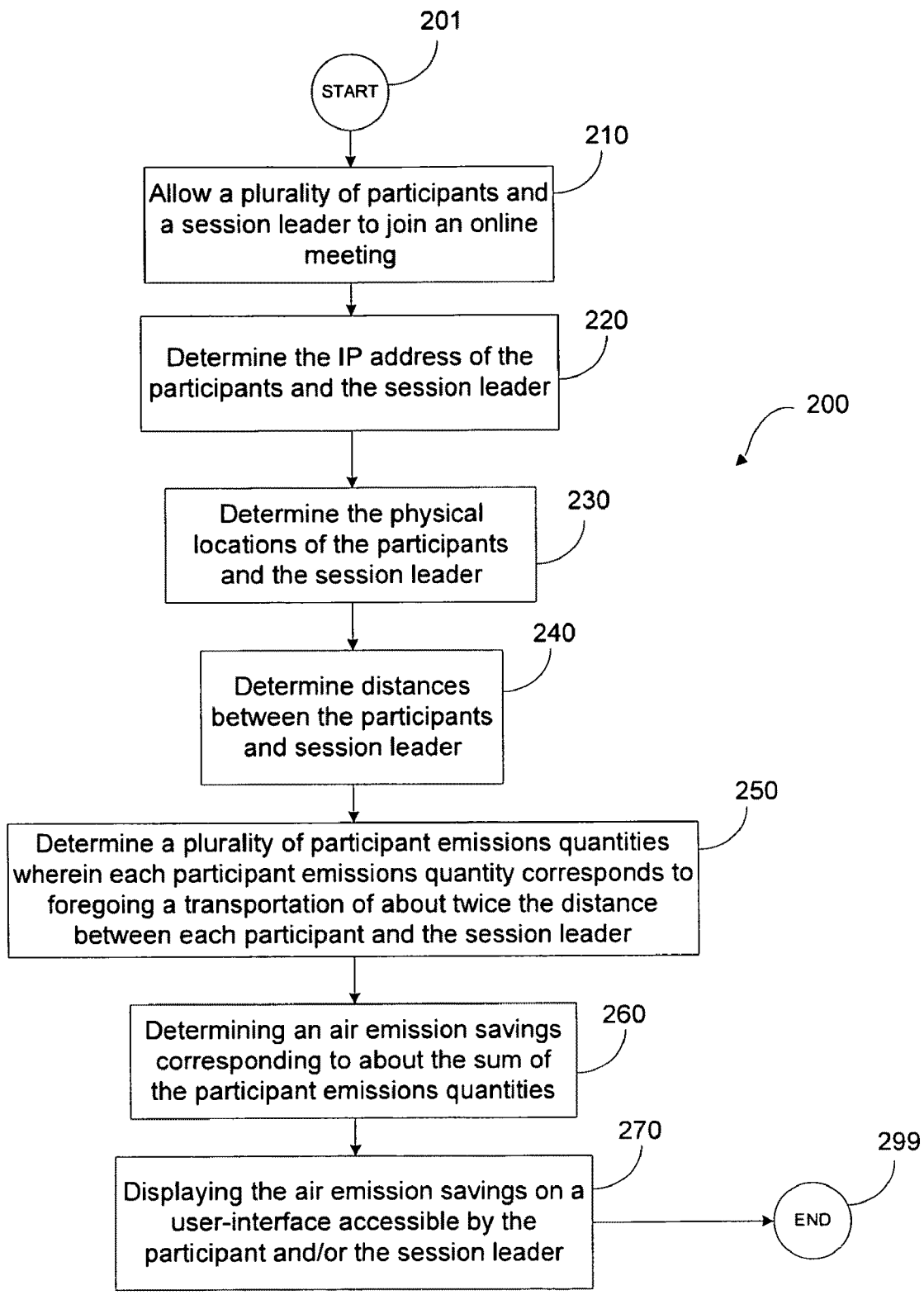
FIG. 2B illustrates an example of a method for determining an air emissions savings corresponding to using an online meeting to forego transportation of the participant.

FIG. 2B illustrates an example of a method for determining an air emissions savings corresponding to using an online meeting to forego transportation of the participant. Method 200 commences at step 201. In step 210, a session leader SL and a plurality of participants join an online meeting P1, P2, and P3. In step 220, the IP address of each user is determined. Based on the IP address of each user, the physical location of each user is ascertained in step 230.

In step 240, distances between the session leader and each participant is determined based on the physical locations of each user. Using the example locations depicted in FIG. 2A for reference, the driving distances from the physical location of each participant to the physical location of the session leader would be: about 1,641 miles from Houston to New York, about 2,521 miles from Las Vegas to New York, and about 790 miles from Chicago to New York. Alternatively, flying distances between the same physical locations would be: about 1,229 miles from Houston to New York, about 1,948 miles from Las Vegas to New York, and about 641 miles from Chicago to New York.

Based on the distances determined in step 240, participant emissions quantities are determined in step 250. The participant emissions quantities correspond to the quantity of air emission savings that result from foregoing transportation of each participant from each participant's physical location to the session leader's physical location. In step 260, an air emission savings corresponding to about the sum of the participant emissions quantities is determined.

In step 270, the air emissions savings determined in step 260 is displayed on a user interface accessible by at least one participant and the session leader. Method 200 terminates at step 299.

Figure 3A:
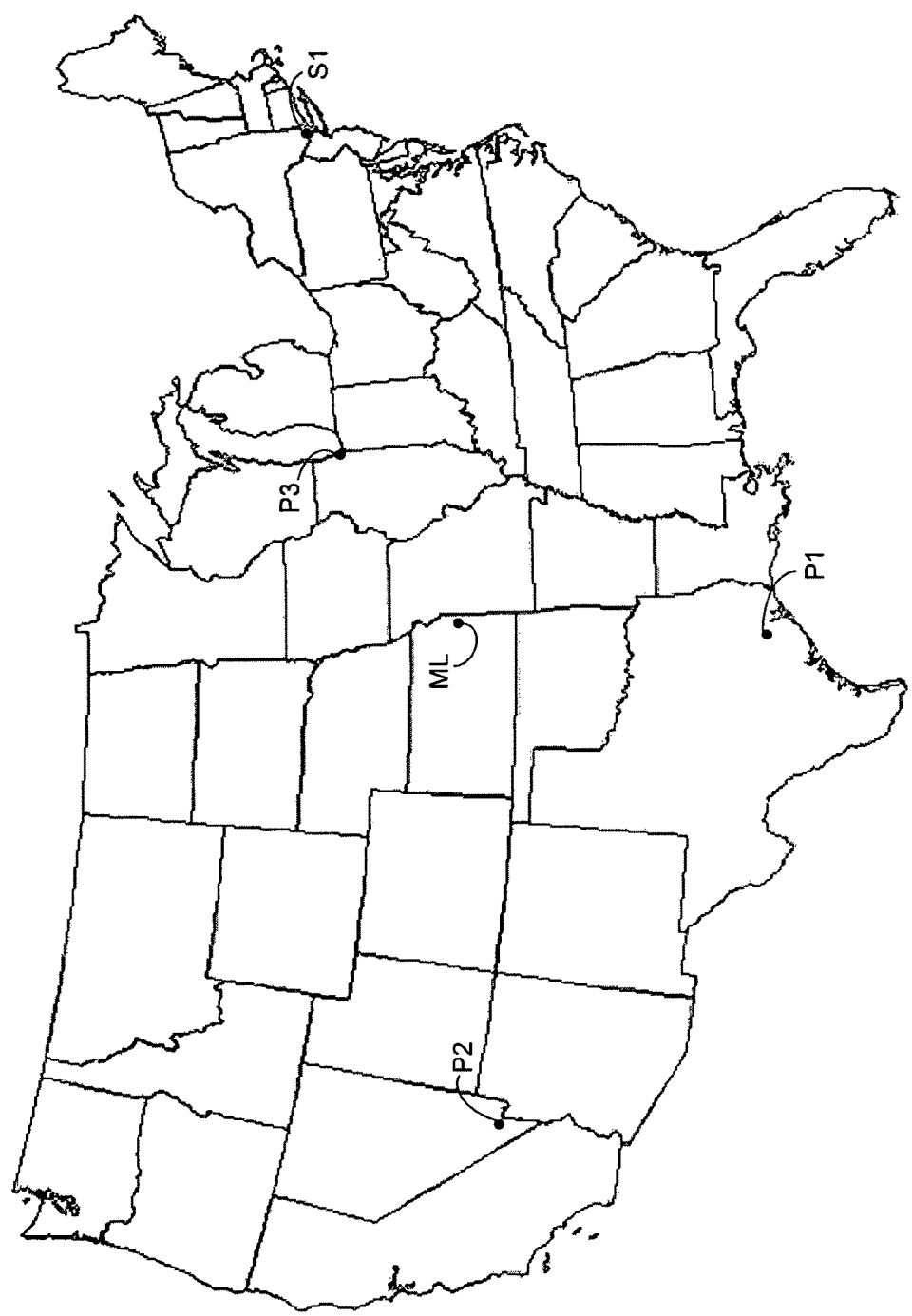
FIG. 3A shows a map with example physical locations of a meeting location, a session leader, and a plurality of participants.

FIG. 3A shows a map with example physical locations of a meeting location, a session leader, and a plurality of participants. In this example, the physical location of participant P1 is shown as Houston, Tex., participant P2 is shown in Las Vegas, Nev., participant P3 is shown in Chicago, Ill., session leader S1 is shown in New York, N.Y., the meeting location ML is shown as Kansas City, Kan.

Figure 3B:
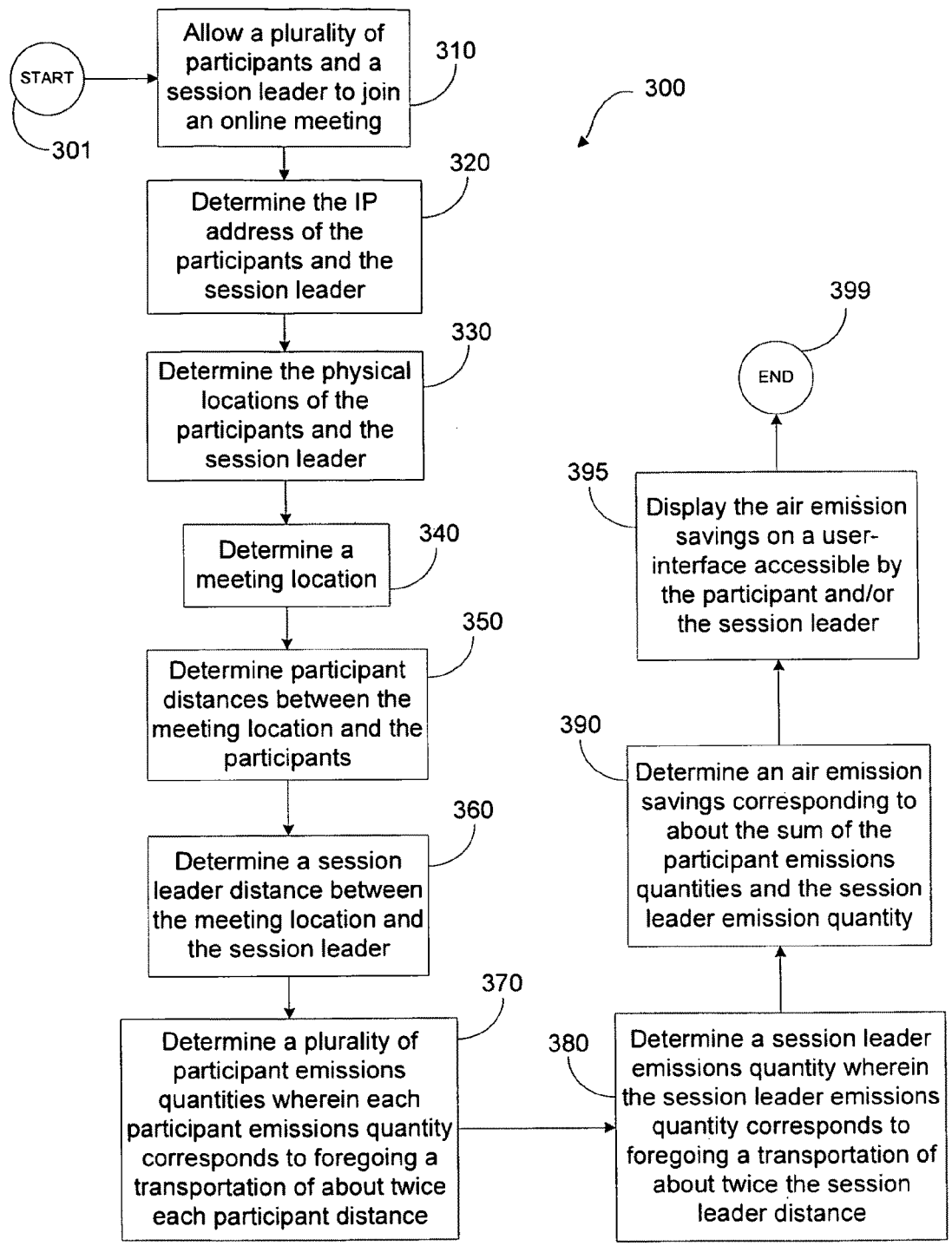
FIG. 3B illustrates an example of a method for determining an air emissions savings corresponding to using an online meeting to forego transportation of the participant.
Figure 4A:
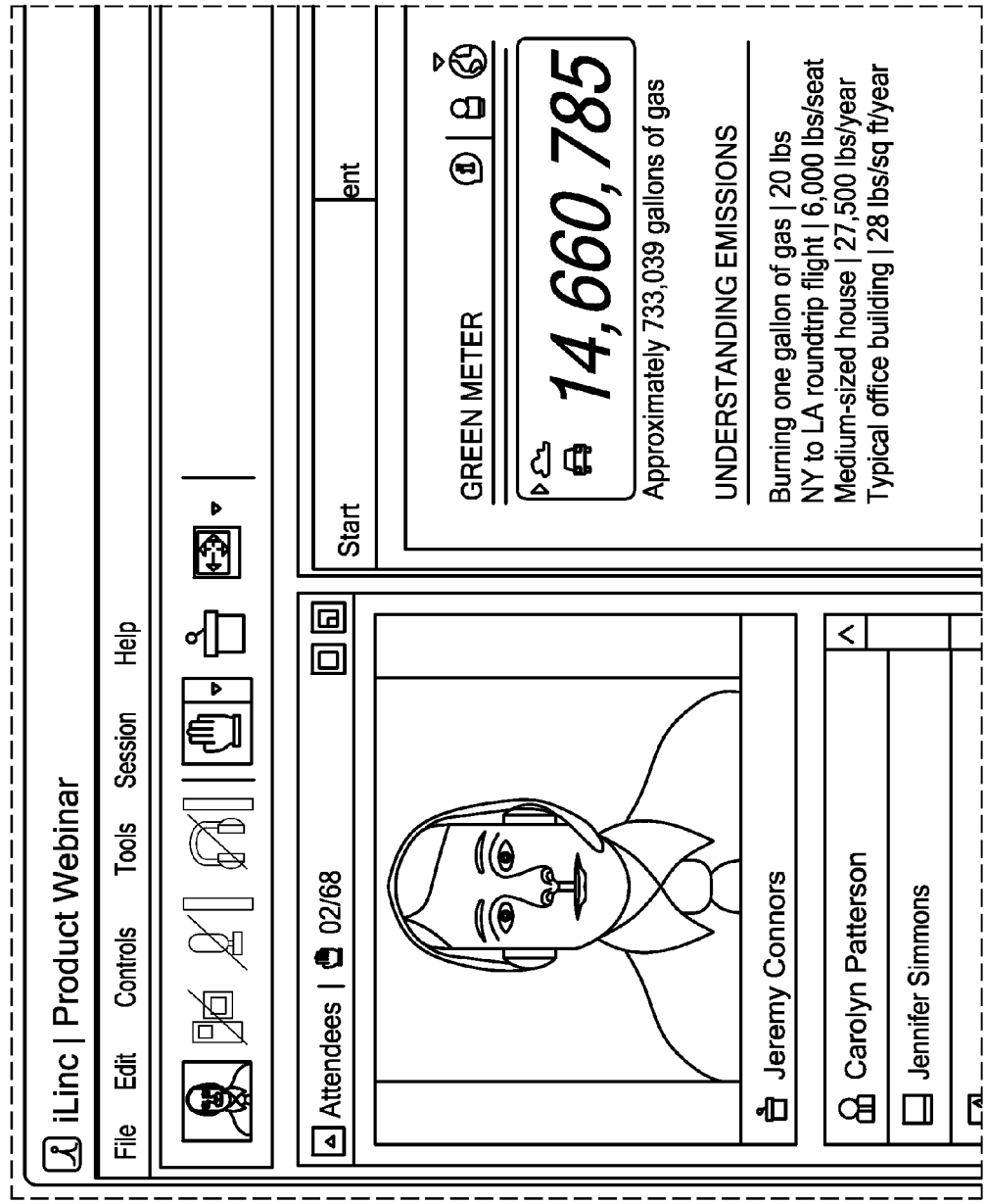
FIGS. 4A-4D illustrate one example of a computer-generated report that displays emission savings, travel distance saved, fuel saving (in gallons of gas), and other information related to savings achieved through the use of online web conferencing methods.
Figure 4B:
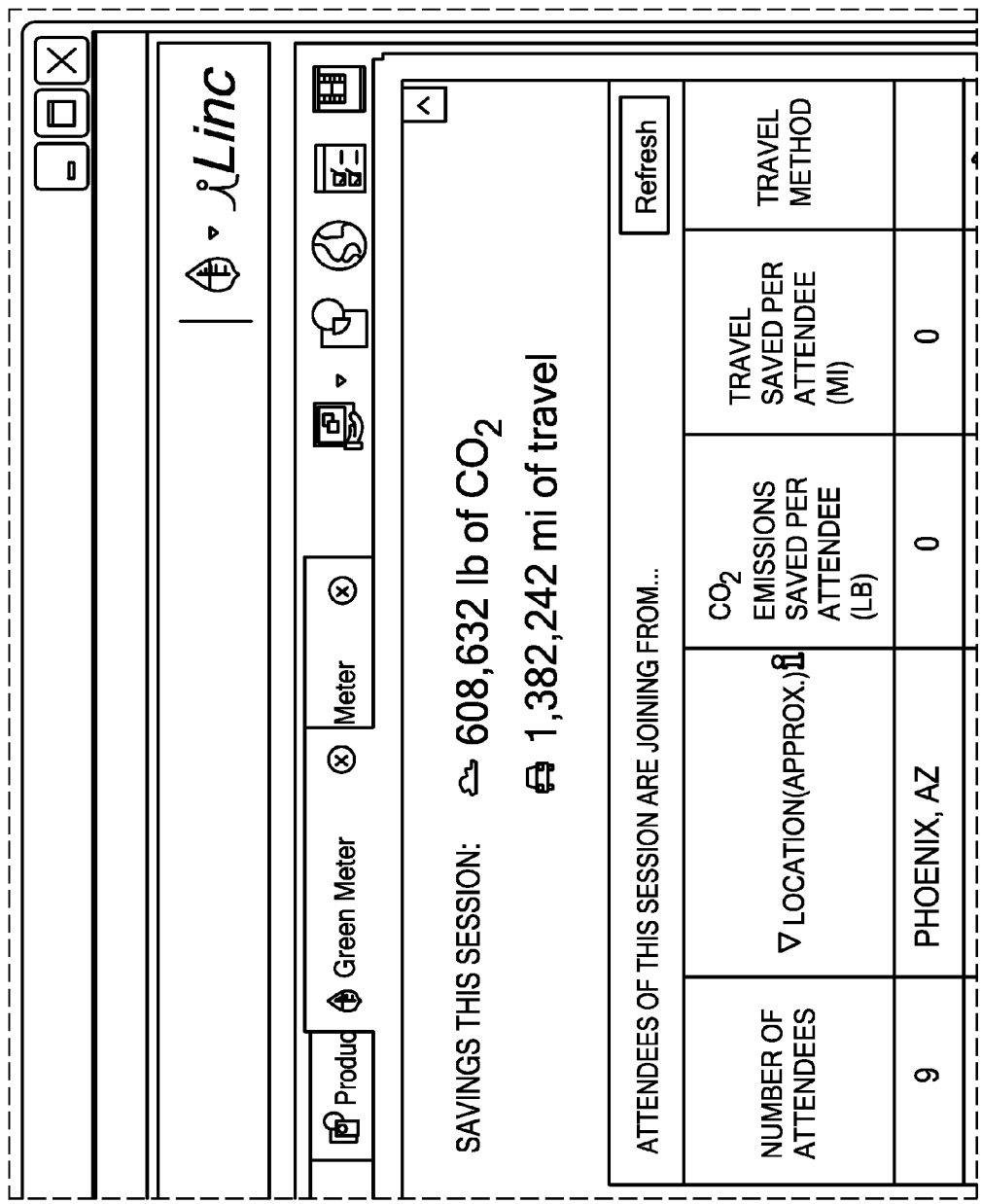
Figure 4C:
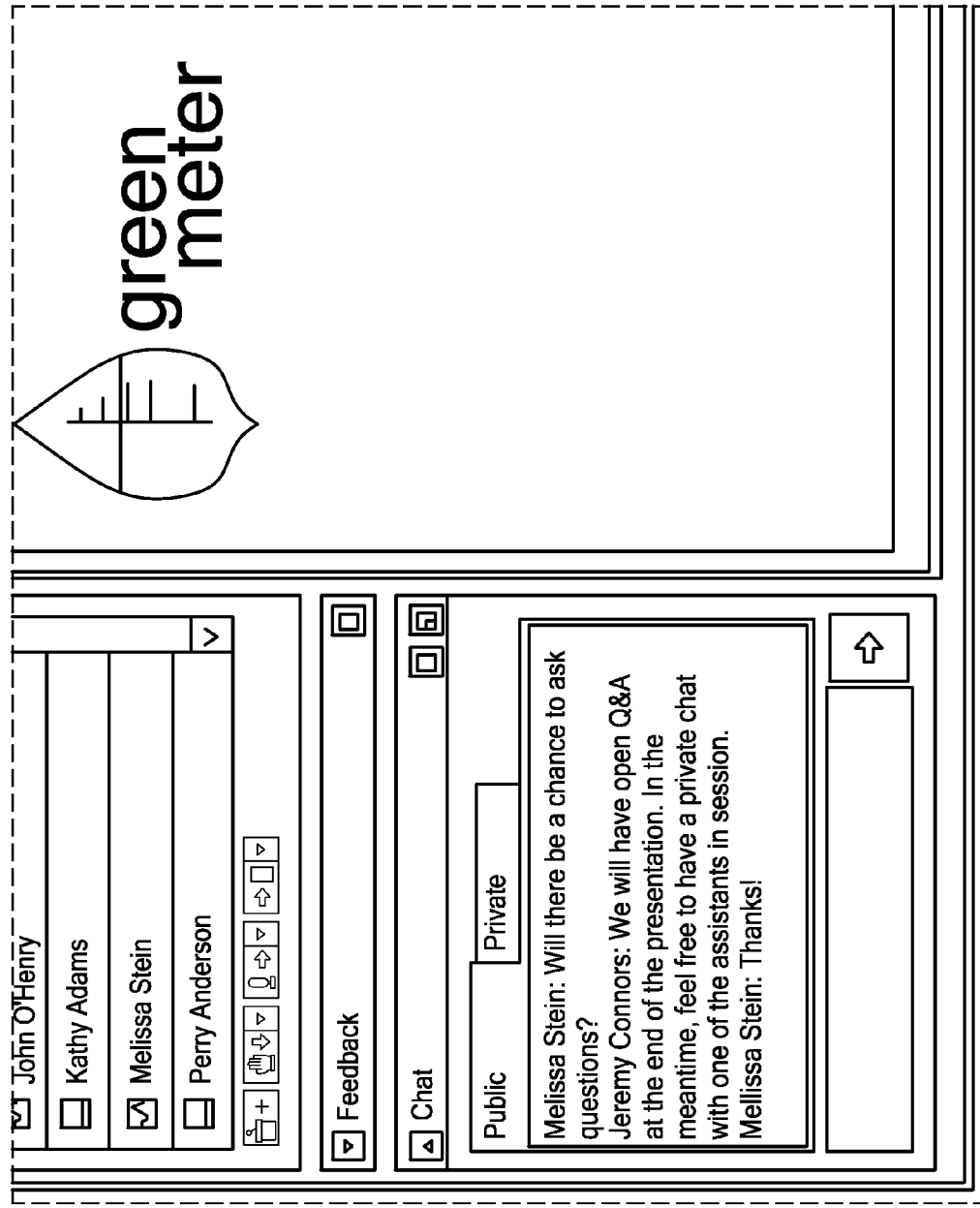
Figure 4D:

Referring to FIG. 3B, method 300 commences at step 301. In step 310, a plurality of participants and a session leader join an online meeting. In step 320, the IP address of each user is determined. In step 330, the physical locations of each user is determined based on each user's respective IP address. A hypothetical meeting location is determined in step 340. Hypothetical travel distances between each participant and the hypothetical meeting location is determined in step 350 to arrive at participant distances. In certain embodiments, the hypothetical meeting location is determined by user input, and in other embodiments, it is determined by an algorithm that selects a hypothetical meeting location based upon minimizing overall physical transportation of all users. The distance between the physical location of the session leader and the meeting location is determined in step 360. Based on the participant distances determined in step 350, participant emissions quantities are determined in step 370 where each participant emissions quantity corresponds to the air emissions saved from foregoing a transportation of about twice each participant distance. Likewise, a session leader emissions quantity is determined in step 380. In step 390, a total air emission savings is determined as the sum of the participant and session leader emissions quantities.

In any of the aforementioned embodiments, any variable relating to the aforementioned travel distances may be displayed on the user interface instead of air emissions savings including, but not limited to, total travel time saved by one or more participants, total travel distance of one or more participants, and any other suitable variable corresponding to the travel distance of one or more of the participant travel distances.

FIG. 4 illustrates one example of a computer-generated report that displays emission savings, travel distance saved, fuel saving (in gallons of gas), and other information related to savings achieved through the use of online web conferencing methods.

Figure 5:
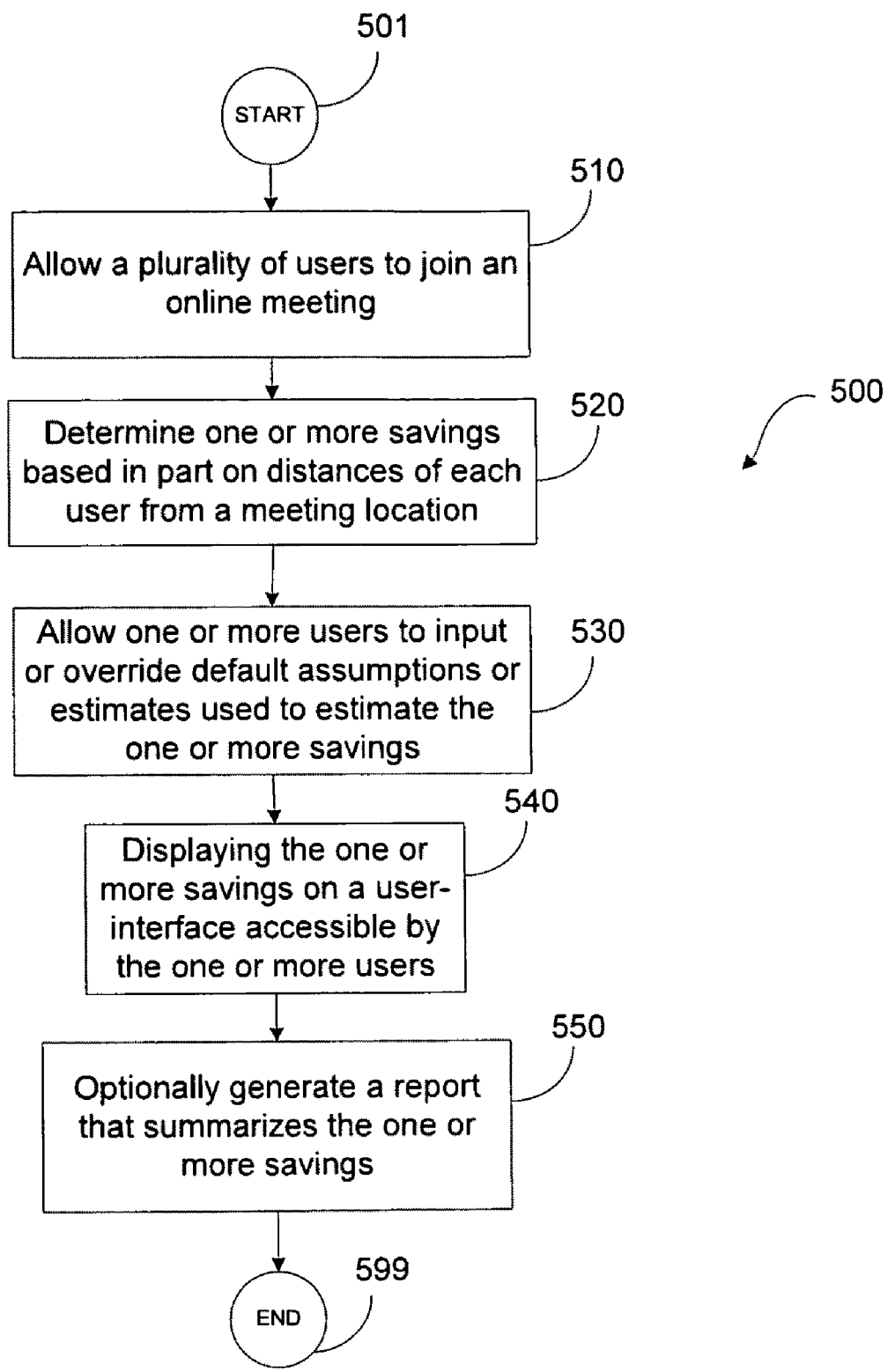
FIG. 5 illustrates an alternative embodiment of a method for online web conferencing that determines and displays certain web conferencing savings or benefits.

FIG. 5 illustrates an alternative embodiment of a method for online web conferencing that determines and displays certain web conferencing savings or benefits. In addition to the foregoing methods, certain embodiments may include additional features as shown in FIG. 5.

For example, in addition to or as an alternative to determining and displaying air emission savings, methods of the present invention may display other variables of interest. Such variables of interest include any variable determined by the aforementioned methods, including, but not limited to, total travel time and/or travel distance of each participant and/or session leader or any combination thereof.

Additional variables of interest may be determined and/or displayed. Such variables of interest include any type of cost, productivity, or environmental savings that result from foregoing travel to a meeting location by virtue of the online collaborative web conferencing. For example, by associating a salary or other cost attribute with each meeting participant, a total cost productivity cost savings may be determined using the total travel time saved by virtue of the online collaborative web conferencing. Moreover, mileage cost savings may be determined and/or displayed as desired. Additionally, a return on investment (ROI) may be calculated to show the one or more benefits of the online conferencing methods as a ratio to one or more costs such as license fees or other costs related to the online conferencing methods. Such an ROI calculation enables the user to estimate the value of the online conferencing methods with respect to certain benefits thereof.

To simplify these calculations, default assumptions may be made as to certain intermediate variables used in computing each of the aforementioned variables of interest. For example, an average miles-per-gallon (mpg) may be assumed to determine fuel saved, fuel costs saved, and/or emission savings. An average personnel salary or cost may be assumed to determine personnel productivity savings. Other cost variables may be assumed such as a company paid per-diem rate, an average nightly hotel rate, etc. A default distance threshold or thresholds may be assumed to determine whether an individual's travel would have been by automobile, plane, or train travel. For example, a default distance threshold of 200 miles might be assumed to determine that an individual would have traveled by automobile for any distance less than 200 miles but by air for any distance greater than 200 miles. Each of these default assumptions may be overridden by the user or otherwise user-specified as desired. These user-specified intermediate variables may be applied on a per meeting basis, a per team basis, a global basis, or any combination thereof. Specifying more precise values for one or more default assumptions renders more accurate results and predictions from the models used in the methods herein.

Commencing at step 501, Method 500 is a method for online web conferencing that determines and displays certain web conferencing savings or benefits. Upon commencing an online meeting in step 510, method 500 employs various models to determine one or more savings that result from the online meeting in lieu of a physical meeting requiring physical transportation of one or more of the participants or session leaders. The one or more savings may include, but is not limited to an emission savings, a cost savings, a productivity savings, a fuel savings, or any combination thereof.

In step 530, one or more users may override or input more accurate default assumptions or estimates used by the various estimating models of method 500. In this way, more accurate estimates are achieved. In certain embodiments, step 530 may precede step 520. In step 640, one or more of these results are displayed to the user. In step 650, an optional report may be generated.

FIG. 6 illustrates one example of a user-interface input dialog box allowing a user to override various default assumptions used in models of the present invention.

Figure 7A:
Figure 7B:
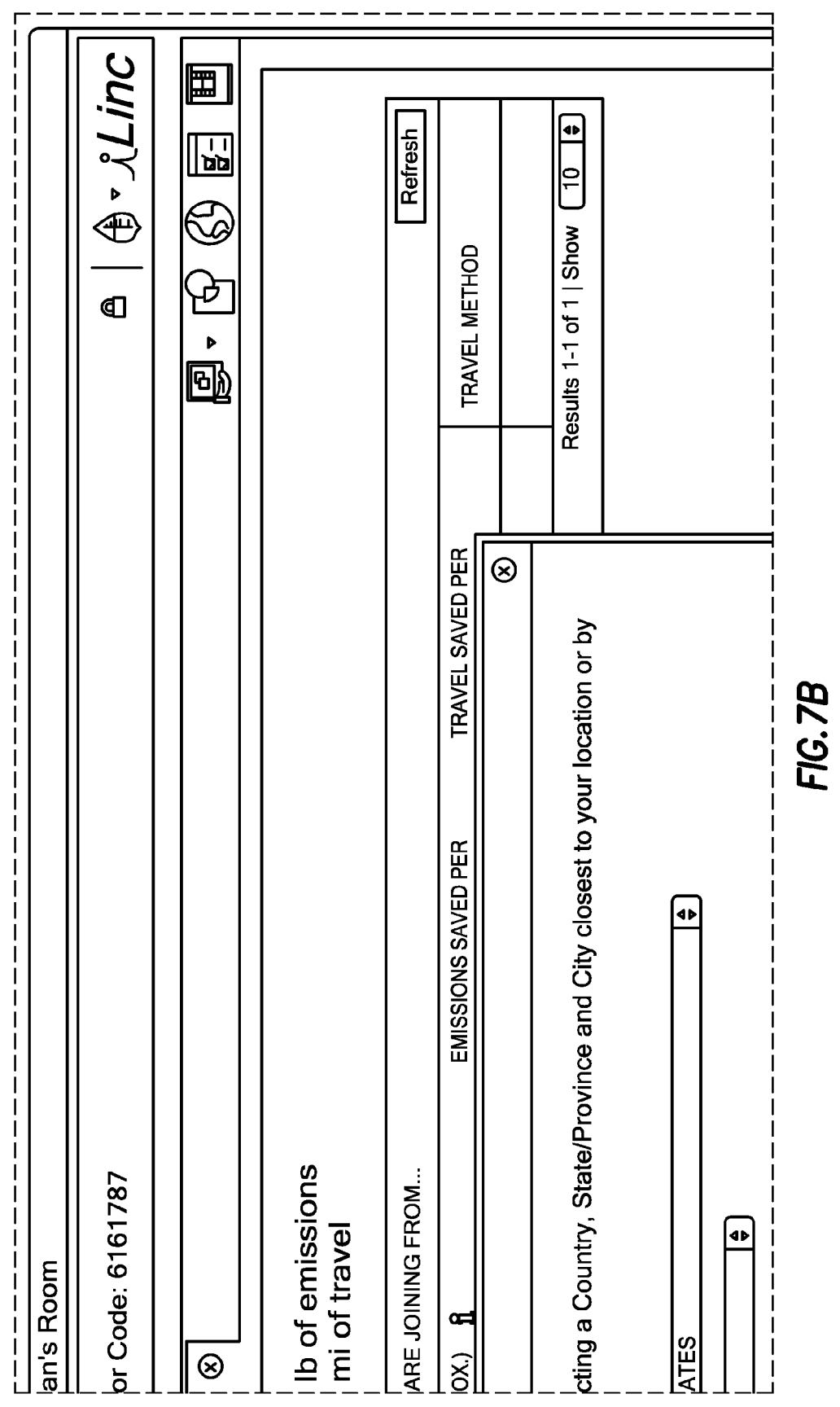
Figure 7D:
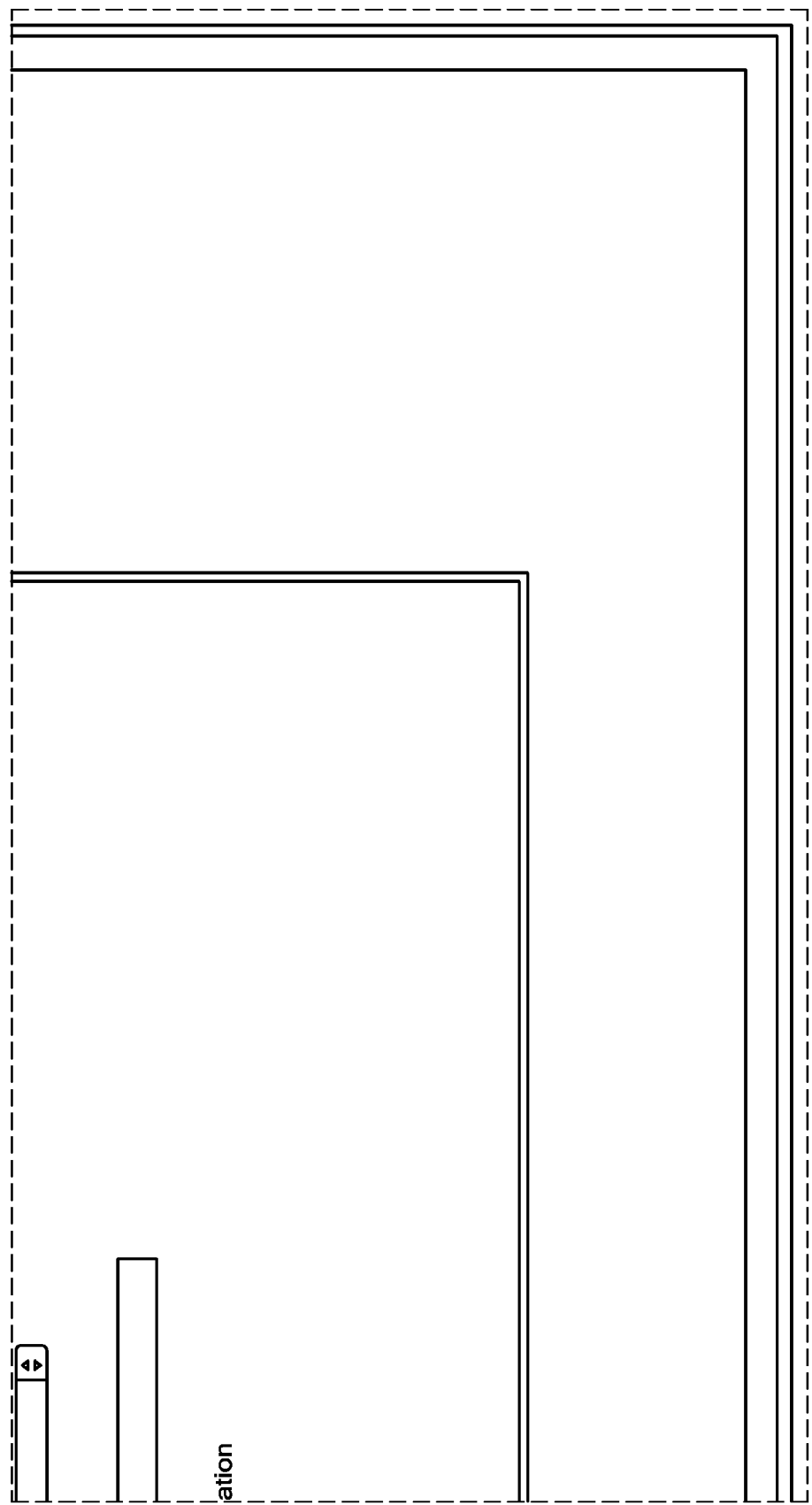

Additional improvements in accuracy may be achieved by allowing users to specify their actual physical location in lieu of their estimated position based on their public IP address. As previously stated, estimated locations based on a user's public IP address may be inaccurate for those users using a proxy network connection or for those users whose ISP is physically located far from the user's actual location. Accordingly, in those instances where the estimated position is not accurate, allowing user-specified locations to override the estimated user positions will result in more accurate results (e.g. emission savings, cost savings, travel savings, productivity savings, etc.). FIG. 7 illustrates one example of a user input dialog box allowing a user to override a default or estimated location by specifying a more accurate physical location.

For convenience, any of the aforementioned variables of interest including emission savings may be displayed to one or more users before the commencement of an online collaborative web conference, after an online collaborative web conference, or during an online collaborative web conference. In certain embodiments, the aforementioned variables may be displayed with reference to a previous point in time or with reference to real-time. In still other embodiments, the aforementioned variables may be displayed with reference to a future point in time based on predicted savings.

Each of these additional parameters may be stored in memory or displayed to the user as desired. Additionally, running totals of each of the aforementioned variables of interest may be determined and displayed as desired.

Other methods of improving estimation accuracies include the ability to exclude certain personnel or meetings from the calculation methods described herein. For example, recognizing that some personnel would not travel even without the online collaborative web conference methods described herein, a company may desire to modify the calculation methods therein to exclude these personnel. Accordingly, the methods herein allow a user to exclude certain personnel or meetings from the calculations described herein.

More broadly, the methods herein may be adapted to account for any additional energy expenditure or saving as desired. For example, a company may wish to account for any increase in energy expenditure or emissions output on account of additional computer or server usage caused by the implementation of the computer-implemented methods described herein. By incorporating this additional energy usage, more accuracy in energy usage and emissions estimation may be achieved. Likewise, in determining energy or emissions usage or savings, any suitable energy output or input may be incorporated into the methods herein. Suitable energy or emissions outputs or inputs may be any energy output or input that results from an attendee attending or not attending a physical or online meeting, including, but not limited to, air conditioning and/or lighting usage where an attendee may be located, energy usage and emissions output from the commute of an attendee, or any combination thereof. Such exemplary energy or emissions savings may also be useful in computing carbon credits as required by certain environmental programs. Additionally, these computations, including carbon credits may be displayed in the form of, "Reduced savings by X percent to account for energy usage," where X is zero by default.

It is explicitly recognized that one or more methods of the present invention may be implemented via an information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU or processor) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A method for online web conferencing implemented in an information handling system comprising:
 (a) allowing a plurality of users to join an online meeting via a plurality of computers wherein the plurality of computers are communicatively connected in a network;
 (b) allowing one of the users to override a default assumption or default estimate used to determine one or more savings by way of an input dialog box;
 (c) determining the one or more savings based in part on hypothetical travel distances of each user to a meeting location wherein the one or more savings is selected from the group consisting of: an air emission savings, a cost savings, and a productivity savings wherein the determining is accomplished via a microprocessor;
 (d) displaying the one or more savings to at least one of the users on a display panel;
 determining an IP address of each user;
 determining an estimated physical location of each user that corresponds to the IP address of each user; and
 determining the hypothetical travel distance as the distance between the estimated physical location and the meeting location;
 wherein the one or more savings comprises an air emission savings; and wherein the air emission savings corresponds to foregoing a transportation of the hypothetical travel distance of each user, wherein the air emission savings is calculated as an automobile emissions calculation when a participant physical location is less than a threshold distance from a session leader physical location and calculated as an aircraft emissions calculation when the participant physical location is greater than the threshold distance.

2. The method of claim 1 further comprising displaying the hypothetical travel distance of at least one of the users wherein the hypothetical travel distance is the distance between the at least one of the users and the meeting location.

3. The method of claim 1 further comprising generating a report that summarizes the one or more savings for the online meeting.

4. The method of claim 1 further comprising repeating steps (a)-(d) a plurality of times for a plurality of online meetings; and generating a report that summarizes the one or more savings for the plurality of online meetings.

5. The method of claim 1 wherein the one or more savings comprise an air emission savings; and wherein the air emission savings comprises a quantity of $CO_2$ emissions.

6. The method of claim 1 wherein the one or more savings comprise an air emission savings; and wherein the air emission savings comprises a quantity of $NO_x$ emissions.

7. The method of claim 1 wherein the one or more savings comprises an air emission savings; and wherein the air emission savings comprises a quantity of a plurality of air pollutants.

8. The method of claim 1 wherein the threshold distance is between about 100 to about 200 miles.

9. The method of claim 1 wherein a subset of the plurality of users is excluded from the step of determining one or more savings.

* * * * *